July 28, 1964      K. A. SWANSTROM      3,142,325
NUT HAVING SEGMENTED LOCKING EXTENSION
Filed Feb. 13, 1959      2 Sheets-Sheet 1
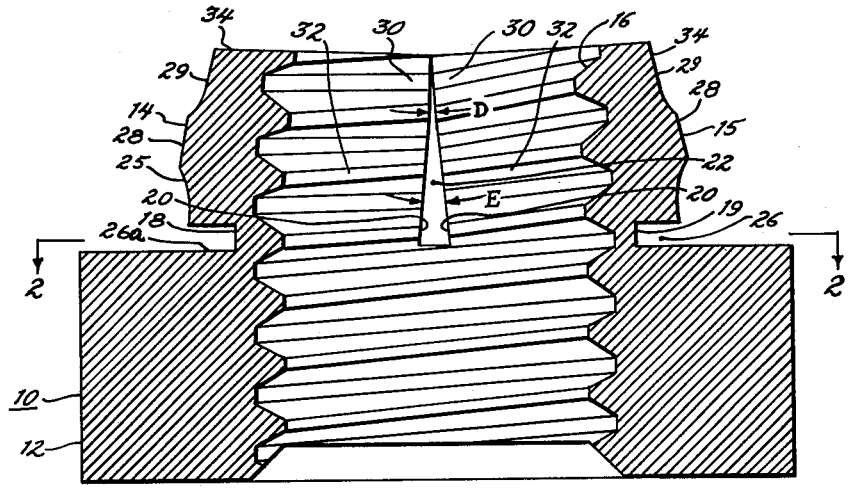
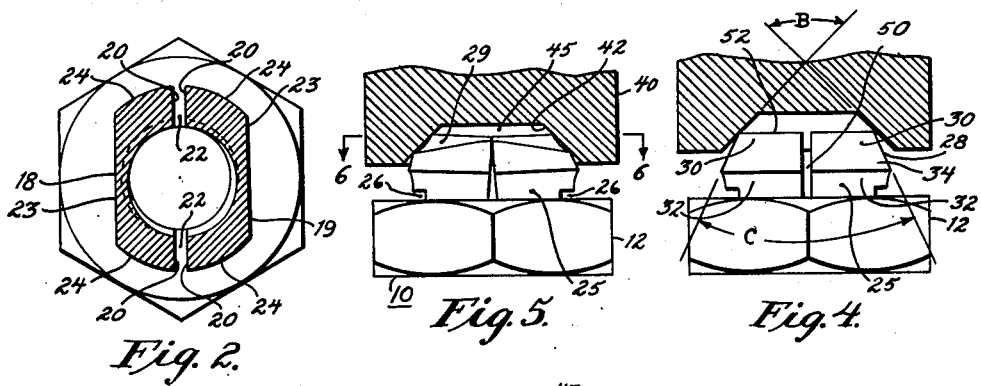
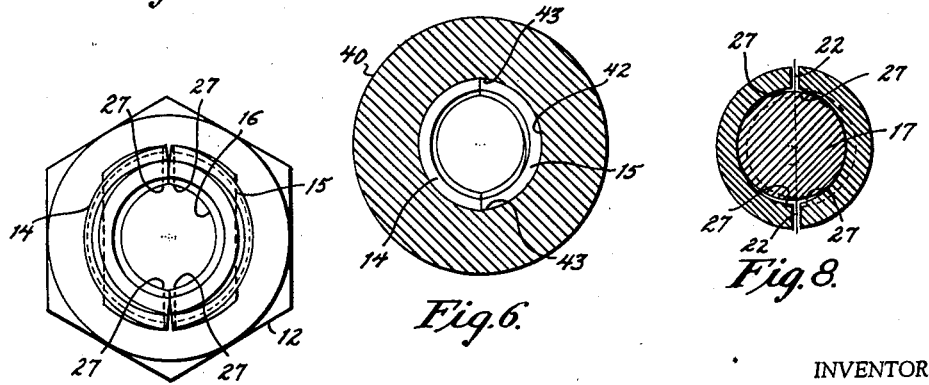
INVENTOR.
KLAS ARENT SWANSTROM
BY
HIS ATTORNEY July 28, 1964   K. A. SWANSTROM   3,142,325
NUT HAVING SEGMENTED LOCKING EXTENSION
Filed Feb. 13, 1959   2 Sheets-Sheet 2
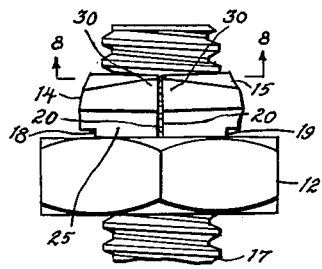
Fig. 7.
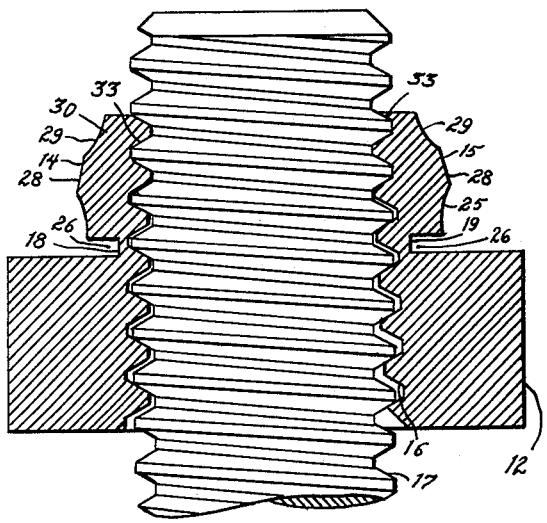
Fig. 9.
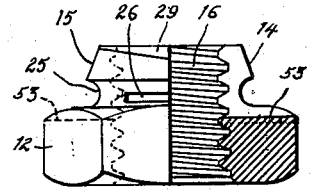
Fig. 11.
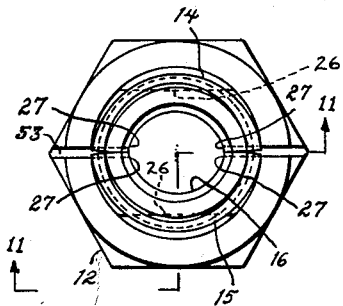
Fig. 10.
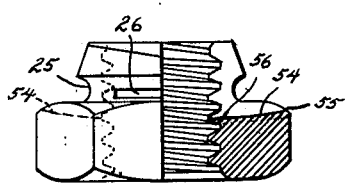
Fig. 12.
INVENTOR.
KLAS ARENT SWANSTROM
BY
HIS ATTORNEY.

United States Patent Office 3,142,325
Patented July 28, 1964

3,142,325
NUT HAVING SEGMENTED LOCKING
EXTENSION
Klas Arent Swanstrom, Doylestown, Pa., assignor to Penn Engineering & Manufacturing Corporation, Doylestown, Pa., a corporation of Pennsylvania
Filed Feb. 13, 1959, Ser. No. 793,102
9 Claims. (Cl. 151—21)

My invention is an improved all metal lock nut which is flexible, resistant to vibration, and so designed as to prevent the galling or cutting of the screw with which it is associated.

Heretofore, lock nuts of the general type to which my invention relates have either contained many segments to provide flexibility or have been substantially solid to resist vibration. The exacting demands of modern aircraft and industry as well as of military specifications require that a lock nut operate at relatively high temperatures, 500° F.–800° F., be able to withstand severe vibration, and, at the same time, so engage the screw that neither the plating on the screw or on the nut will be damaged by assembly and removal of the nut from the screw.

It is customary to cadmium plate or otherwise plate carbon steel nuts and screws so as to prevent corrosion and, at the same time, keep the cost of such items within a reasonable figure. Lock nuts having many segments have a correspondingly large number of slots which must be plated. Obviously, the greater the number of slots to be plated the greater the likelihood that one or more slots or parts thereof will be imperfectly plated leaving dangerous corrosion points. Likewise, a lock nut having a large number of segments must necessarily have a large number of edges each of which may tend to cut or gall the screw with which the nut is associated and thus initiate corrosion. If a lock nut is made quite flexible so as to reduce the cutting action between the nut and the screw the likelihood is that the fastener will not merely flex when placed upon a screw but will instead take a permanent set and thus fail in use by spinning off the screw because of insufficient torque or holding action with relation to the screw.

In my improved lock nut I provide but two flexible segments whose leading edges are recessed away from the thread of the screw which segments have a circumferential undercut, the undercut being reduced by two horizontal slots parallel with the two opposed slits by which the segments were formed. These lock nuts or fasteners have proven to have excellent flexing qualities without any visible cutting effect on a screw even after many assemblies and removals. In vibration tests my improved lock nuts have held firm until the screws themselves failed.

In the preferred embodiment of my invention, the lock nut comprises a body or nut portion and an integral extension. The extension comprises two opposed, locking segments joined to the body portion of the nut by a beam which may be considered to have a U-shape in cross section, the beam being thinnest in the area 90° remote from the slits separating the opposed segments. The opposed segmental members have a generally semi-elliptical shape at the top thereof so that the leading edges adjacent the top of the vertical slits separating the segments are relieved and spaced away from a true circle. The semi-elliptical shape prevents any interference or cutting between the leading edges of the segments and the screw threads.

The portions joining the segmented sections and the body portion of the nut are such as to provide sufficient thickness and strength to generally resist the adverse effects of vibrations and, at the same time, thin enough and flexible enough in particular parts to allow repeated flexing of the locking segments without failure or without set so that the nut and screw may be assembled and disassembled many times without adversely affecting the engagement between them or the plating on either part of the assembly.

Where very severe vibration is to be encountered, I may modify my lock nut by extending the slit, which separates the two opposed segments down into the body portion of the lock nut. By so doing, the line about which the two main parts of the nut will vibrate is shifted from the juncture between the body portion and the integral extension, where the body walls are thinnest, down into the nut portion where the body wall is substantially heavier. Such slit extension may be a straight cut extending to the same depth throughout the nut portion or it may be an arcuate cut so that the deepest portion of the cut occurs at the wall portions immediately adjacent the threaded bore.

It is an object of my invention to provide a simplified lock nut highly resistant to vibration but which will readily flex.

It is a further object of my invention to provide a lock nut which is easy to plate and which will not tend to cut a screw inserted therein.

It is a still further object of my invention to provide a lock nut which can be visibly checked without difficulty to determine if the lock characteristic has been added to the nut.

The principles and characteristic features of my invention and the best mode in which I have contemplated applying such principles will further appear from the following description and the accompanying drawings in illustration thereof.

FIG. 1 is a longitudinal sectional view of my lock nut incorporating my invention;

FIG. 2 is a cross-sectional view taken along the line 2—2 of FIG. 1;

FIG. 3 is a plan view of the lock nut illustrated in FIG. 1;

FIG. 4 is a view of the lock nut illustrated in FIGS. 1, 2 and 3 when it is initially engaged by the die;

FIG. 5 is a view similar to FIG. 4 but illustrating the termination of the forming operation;

FIG. 6 is a cross-sectional view taken along the line 6—6 of FIG. 5;

FIG. 7 is a side elevational view of a lock nut constructed in accordance with my invention mounted upon a screw;

FIG. 8 is a cross-sectional view along the line 8—8 of FIG. 7;

FIG. 9 is a longitudinal sectional view of my lock nut mounted upon a screw.

FIG. 10 is a top plan view of my modified lock nut;

FIG. 11 is a side elevational view of my modified lock nut, partly in cross section, taken along the line 11—11 of FIG. 10; and FIG. 12 is a view similar to FIG. 11 of my lock nut further modified with a radial slit in the nut portion.

Referring to the drawings, and in particular in FIG. 1, there is illustrated a lock nut 10 comprising a body or nut portion 12 having flat peripheral surfaces adaptable to be engaged by a wrench or other similar device. Extending upwardly from the body 12 and integral therewith are two opposed locking flexible segments 14 and 15. The body 12 and the lock members 14 and 15 are provided with a vertically extending internally threaded bore 16 suitable for placing upon a threaded screw 17 (FIGS. 8 and 9). The locking segments 14 and 15 include integral U-shaped joining portions 18 and 19 (FIGS. 2 and 9), respectively, which join the locking segments 14 and 15 to the body 12. The locking members 14 and 15 and joining portions 18 and 19 include opposed wall portions 20 that define two generally triangular axial spaces 22.

The joining portions 18 and 19 are made more flexible at the center of their bases 23 than at their sides 24 to facilitate the flexing of the locking members 14 and 15. The sides 24 and bases 23 are defined by an annular undercut recess or cavity 25 and parallel slots or cavities 26, respectively, the latter being parallel to the spaces 22 and disposed so that the thinnest portions of the bases 23 are 90° removed from the spaces 22. The lower surfaces 26a defining the slots 26, as illustrated in FIGS. 1 and 9, lie in the plane of the juncture between the body 12 and the joining portions 18 and 19 but may in fact be in a plane slightly above such plane of juncture due to manufacturing difficulties.

When viewed from the top, as in FIG. 3, the locking segments 14 and 15 of the nut form generally an ellipse, the major axis of such ellipse being along the line of juncture of the opposed walls 20 when such walls are touching or being straddled by such walls 20 when such walls are spaced from each other. By reason of the elliptical shape, the leading edges 27 of the thread in the upper portion of the segments 14 and 15 are removed from engagement with the thread of a screw 17 (FIG. 8). Thus, when there is only tangent contact when a screw 17 progresses through the locking thread 33 of the segments and possible cutting of the screw, or the plating thereon, by such leading and cut edges 27 in the area of locking engagement (see FIG. 9) is avoided. It will be understood that no such relief of the leading edges 27 is necessary in the body 12 of the nut or in the lower portion of the segments where locking engagement between the screw 17 and the nut is non-existent or very limited. As may be seen in FIG. 9 the major locking engagement occurs in the upper portion 30 of the segments.

In the course of relieving the leading edges 27, the upper portions 30 of each of the locking segments 14 and 15 are pushed towards each other to a greater degree than the lower portions 32 of such segments. As illustrated in FIG. 1, only the upper portions 30 may be in abutting relationship before the lock nut is placed upon a screw. When the lock nut is placed upon a screw, as illustrated in FIG. 7, the upper portions 30 of the locking segments 14 and 15 are spread apart so that even the upper portions 30 do not abut each other. Depending upon the characterisitcs of the metal from which the nut is formed, even the upper portion of the walls 20 may be slightly spaced from each other after removal from the forming die. That is to say, while the nut 10 is being formed it will have the shape illustrated in FIG. 5, but when the pressure of the die is removed some nuts made of particular metals, such as aluminum, will have a set such that a slight gap exists between the upper extremities of the walls 20.

The outer peripheral surface 28 of the lock segments 14 and 15 has the general shape of a truncated cone converging upwardly but deviates therefrom because of the semi-elliptical shape in cross-section and because the upper terminal portions of each of the semi-elliptical locking segments 14 and 15 are formed with semi-annular tapered and curved surface portions 29 that have their greatest width in the axial direction (see FIG. 5) directly above each of the cavities 26, becoming narrower as they approach the opposed wall portions 20.

The lock nut is manufactured by forming a blank into a body portion 12 and an extension portion 34, the latter having a truncated cone shaped outer surface 28 and an annular recess 25. The body portion 12 and the extension portion 34 are then provided with a central threaded longitudinal bore 16. The recess 25 is further undercut in two areas by parallel slots 26. The slots 26 while substantially deeper at the center of the bases 23 than the undercut recess 25 do not extend into the bore 16. The slots 26 may be conveniently formed by saw cuts. Thereupon the extension portion 34 is divided into opposed segments 14 and 15 by a thin vertical slit 50 from the top 52 of the extension portion 34 to the base thereof where it joins the body portion 12. At this stage, the two opposed segments 14 and 15 are semi-circular in cross-section throughout their depth (FIG. 4). Ideally, if the nut is to be plated it should be done at this stage but it may be deferred until the bending operation, below described, is completed.

The lock nut is then secured against movement and a punch or die 40 is forced down upon the extension portion 34 until it contacts the upper outer edge portions of the locking members 14, as illustrated in FIG. 4. The punch 40 includes a tapered cavity 42 having a greater angle B than the included angle C of the peripheral surface 28. Continued pressure downward on the punch 40 bends the locking segments 14 and 15 inwardly and toward each other until the upper portions 30 of the opposed walls 20 abut each other and the opposed wall portions 20 become oblique to each other, initiating the deformation of the locking segments 14 and 15 into the tapered and curved portions 29, illustrated in FIG. 1.

The die cavity 42 is sufficiently deep to force the upper portions 30 to come closer together than the remainder of the opposed portions 20 until the upper parts of the opposed surfaces 20 are at an included angle D which is less than the included angle E of the lower portions 32 of the segments, thereby completing the formation of the tapered portions 29. In such movement the walls 20 of the upper portions 30 adjacent the slit 50 are forced to move radially outwardly whereupon the segments 14 and 15 form a generally oval or elliptical shape with the edges 27 remote from the center of the bore 16. The lower portions of the segments 14 and 15 remain substantially semi-circular. The larger included angle of the die cavity in conjunction with the space 45 between the die and the locking members 14 and 15 prevents the top of the locking members 14 and 15 from being pushed down as the die moves downwardly.

As illustrated in FIG. 5, the tapered surfaces 29 are defined by upper edges formed by the top surfaces of the bent in locking segments 14 and 15 which incline downwardly and toward each other and lower edges tapering upwardly and toward each other formed because the die cavity 42 is elliptical or open at opposite ends while the outer conical surface 28 is initially circular in cross-section.

If desired, after the bore is threaded and before the forming by the die 40 is performed, a reamer (not illustrated) may be inserted within the bore for removing burrs that may extend radially inwardly in the vicinity of the opposed portions 20.

The locking segments 14 and 15 are thus bent radially inwardly and toward each other about the joining portions or beams 18 and 19 to provide radial gripping or frictional engagement between the locking members and the screw. In this manner the threads of the locking members 14 are distorted or placed out of phase with the threads of the screw by being moved downwardly along the longitudinal axis, as illustrated in FIG. 1, to provide axial frictional engagement between certain of the sides of the threads of the nut and screw. As illustrated in FIG. 9, this contact is tangential between the screw and nut threads.

As above indicated, a controlled bending of the locking segments 14 and 15 is obtained by first reducing the wall thickness at the base of the extension member 34 by the annular undercut 25 and then further reducing the wall thickness at two areas 26 horizontally opposite one another and parallel with the vertical slits 50 to obtain flexing. At the same time substantial wall thickness is left adjacent the spaces 22 and at the upper end of the bore 16 to provide resistance to vibration and excellent screw engagement characteristics even after numerous assemblies and removals. By causing the leading edges 27 to be moved radially outwardly, as described, no cutting or galling of the screw occurs.

Generally when a lock nut fails on vibration, by spinning off of the screw, it is found upon examination that the segmented portions of the lock nut did not have a sufficiently tight engagement with the threads of the screw, and thus the segments permitted the lock nut to rotate on the screw and thus spin off. However, under extremely severe vibrational environment there may be an actual breaking of the nut. Such latter failure is likely to occur at the base of the segments which forms a line or plane about which the segments 14 and 15 may vibrate relative to the remainder of the nut. Should even partial breakage occur at the base of any segment, the segment will no longer be able to tightly engage the thread of the screw and, as a result, the nut will spin off the screw. To avoid the possibility of failure under such severe environmental conditions, I may modify my lock nut as illustrated in FIGS. 10, 11 and 12.

In my modified lock nut, I continue the slit 50 down into the body portion 12 to form a slit 53 in the body portion. Such slit 53 need not be deep and preferably extends into said body portion a distance approximately equal to 10% of the depth of the body portion. When the body portion is so cut the line or plane of vibration is no longer at the juncture between the extension and the body portion but at the base of the slit 53 which extends the full width of the nut. In this area of the nut the wall portion of the nut is much greater in thickness than that in the integral extension and so will withstand substantially greater vibration. I may provide a straight cut 53 as illustrated in FIG 11 or I may provide an arcuate cut 54 as illustrated in FIG. 12. This latter cut has its shallowest point at the perimeter 55 of the body portion of the nut and has its greatest depth at the point 56 adjacent to the threaded bore 16.

Having described my invention, I claim:

1. A lock nut comprising a body and an integral extension, a threaded bore in said body and extension, said extension including two opposed generally symmetrical segments forming axial and diametrically aligned spaces therebetween, said symmetrical segments together forming a substantially elliptical shape at the end of said extension, said aligned spaces lying along the major axis of said ellipse, and a peripheral recess adjacent the juncture of said body with said extension for facilitating the formation of said segments into a substantially elliptical shape, said recess including enlarged portions intermediate the ends of the major axis of said ellipse for further facilitating said formation, whereby a substantial wall thickness is provided in the areas of said segments adjacent said aligned spaces and a substantially thinner wall thickness in the areas of said segments intermediate said aligned spaces.

2. A lock nut as set forth in claim 1 in which the ends of said segments are inclined to each other and to the major axis of said bore, said segments having opposed surfaces that are inclined toward each other at a smaller angle adjacent the end of the extensions than the angle adjacent said body.

3. A lock nut as set forth in claim 1 in which said recess is of annular shape, and oppositely disposed parallel undercut slots enlarging portions of said recess and having their longest dimensions extending parallel to said aligned spaces.

4. A lock nut as set forth in claim 1 in which said recess is of annular shape and a pair of oppositely disposed parallel undercut slots enlarging portions of said recess and parallel to the major axis of said ellipse, said recess having a U-shaped cross-section at points 90° remote from said major axis.

5. A lock nut comprising a body and an integral extension, a threaded bore in said body and extension, said extension including two opposed generally symmetrical segments forming axial and diametrically aligned spaces therebetween, said symmetrical segments together forming a substantially elliptical shape at the terminal portion of said extension, an annular recess enlarged into oppositely disposed parallel undercuts adjacent the juncture of said body with said extension for facilitating the formation of said segments into an elliptical shape, said segments having terminal portions which are tapered, the taper decreasing uniformly in the direction from said undercuts to said spaces.

6. A lock nut comprising a body and an integral extension, a threaded bore in said body and extension, said extension defining two opposed generally symmetrical segments forming therebetween axial and diametrically aligned spaces extending from the extremity of said extension into said body, the ends of said segments together forming a substantially elliptical shape, said aligned spaces lying along the major axis of said ellipse, and a peripheral recess adjacent the juncture of said body with said extension for facilitating the formation of said segments into a substantially elliptical shape, said recess including enlarged portions intermediate the ends of the major axis of said ellipse for further facilitating said formation, whereby a substantial wall thickness is provided in the areas of said segments adjacent said aligned spaces and a substantially thinner wall thickness in the areas of said segments intermediate said aligned spaces.

7. A lock nut comprising a body and an elongated extension integral therewith, said extension defining two opposed generally symmetrical segments forming therebetween axial and diametrically aligned slits and said slits extending partly into said body, said segments including opposed pairs of wall surfaces at least one of each pair of surfaces presenting a spaced leading edge to a screw upon which the lock nut is mounted, said extension having an annular recess immediately adjacent the juncture of said extension with said body portions of said extension adjacent said body being formed into U-shaped members in cross-section by cavities that enlarge said recess in a radially inward direction, said cavities being generally parallel to said slits and oppositely disposed to each other, said body and extension being bored and threaded, said U-shaped members being more flexible at the base thereof than at the sides of said U-shaped members due to a greater depth of said cavities than said recess, and said segments being bent toward each other for locking upon a screw inserted in said bore.

8. A lock nut comprising a body and an integral extension, said extension defining two opposed generally symmetrical segments forming therebetween axial and diametrically aligned spaces, the ends of said segments farthest from said body forming a substantially elliptical shape, said aligned spaces lying along the major axis of said ellipse, and the juncture wall between the body and the extension being of varying radial thickness symmetrical about the major axis of the ellipse, but extending arcuately uninterruptedly between the aligned spaces, the thinnest parts of the juncture wall lying along the minor axis of the ellipse.

9. A lock nut comprising a body and a tubular extension divided into locking segments, said segments forming therebetween a pair of aligned spaces, said extension having an annular undercut recess adjacent its juncture with said body tending to facilitate the bending of the segments, said recess being enlarged into cavities intermediate the spaces to further facilitate bending of the segments and to define a juncture wall extending between said spaces of varying radial thickness, and said segments being bent toward each other.

References Cited in the file of this patent

UNITED STATES PATENTS 219,783    Vaughan _____ Sept. 16, 1879
1,266,263    Hibbard _____ May 14, 1918

(Other references on following page)

UNITED STATES PATENTS

| | | |
|---|---|---|
| 2,068,613 | Stoll | Jan. 19, 1937 |
| 2,213,353 | Whitcombe | Sept. 3, 1940 |
| 2,255,286 | Harvey | Sept. 9, 1941 |
| 2,563,162 | Eckenbeck | Aug. 7, 1950 |
| 2,570,863 | Rowe | Oct. 9, 1951 |
| 2,592,129 | Engstrom | Apr. 8, 1952 |
| 2,776,692 | Granberry | Jan. 8, 1957 |
| 2,846,701 | Bedford | Aug. 12, 1958 |

FOREIGN PATENTS

| | | |
|---|---|---|
| 810,417 | France | Dec. 28, 1936 |
| 1,179,722 | France | Dec. 22, 1958 |
| 247,303 | Switzerland | Dec. 1, 1947 |